April 21, 1931. F. HUNZIKER 1,801,602
INDEXING CHUCK
Filed Oct. 24, 1929 3 Sheets-Sheet 1
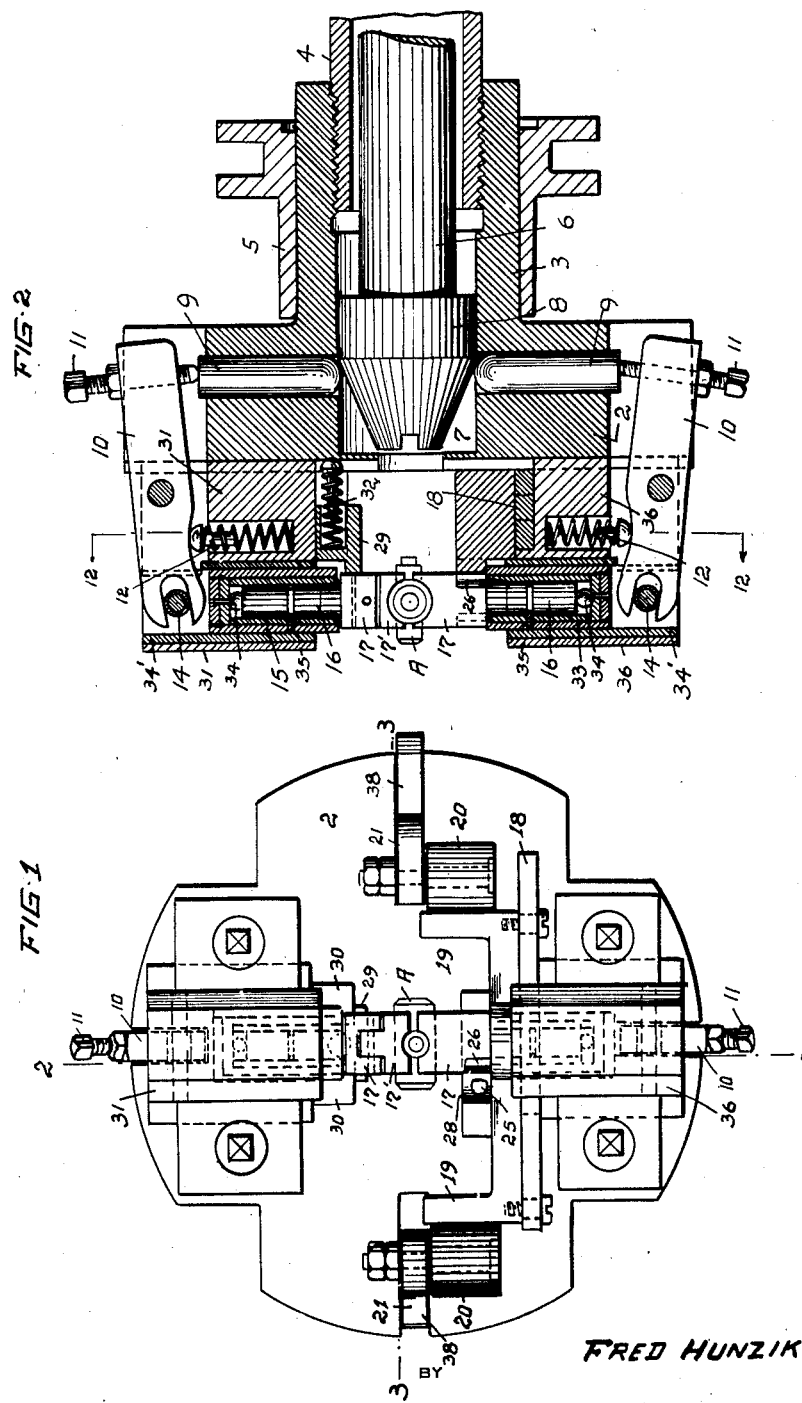
INVENTOR
FRED HUNZIKER
BY Fisher, Moser + Moore
ATTORNEY

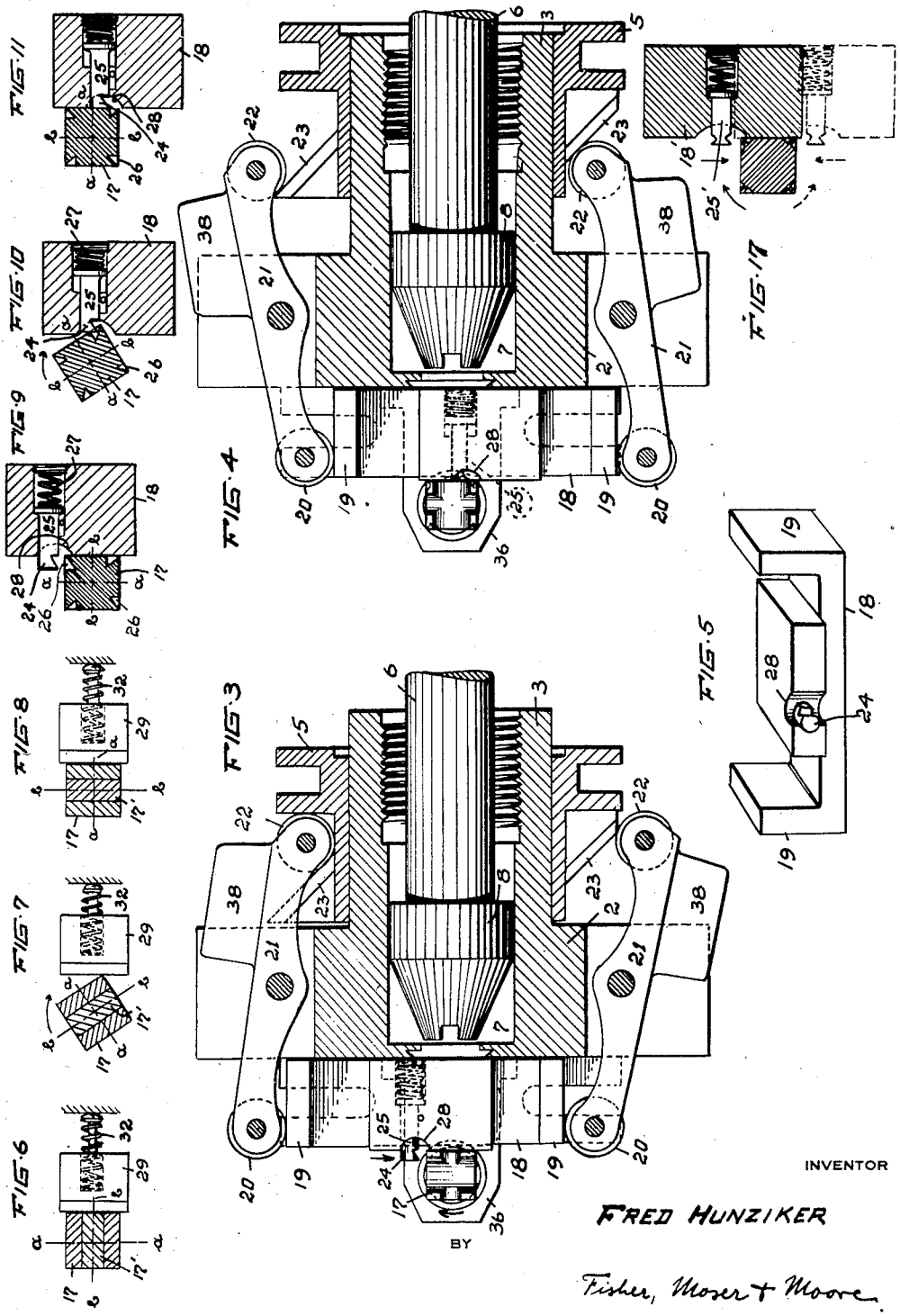

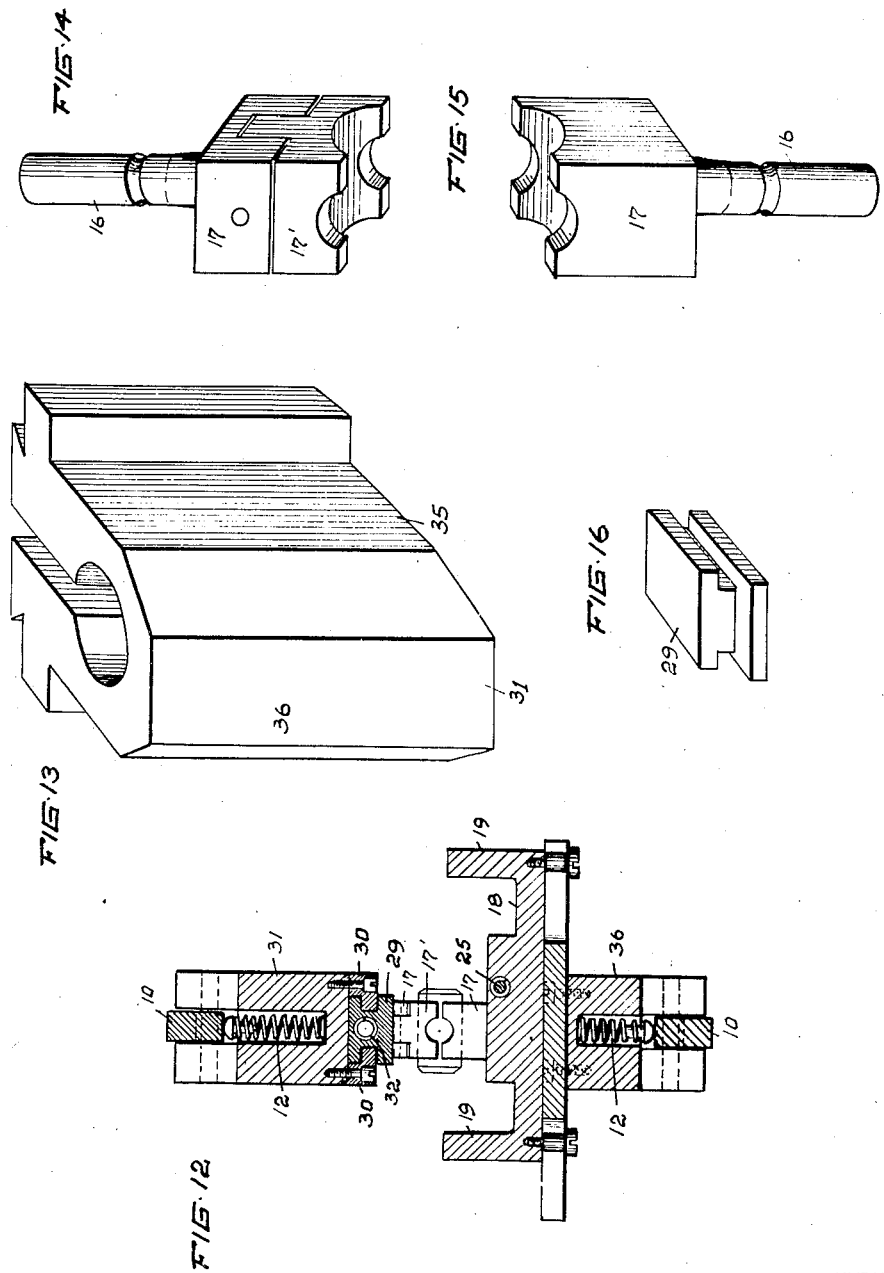

Patented Apr. 21, 1931

1,801,602

UNITED STATES PATENT OFFICE

FRED HUNZIKER, OF CLEVELAND, OHIO, ASSIGNOR OF ONE-HALF TO THE W. J. SCHOEN-BERGER COMPANY, OF CLEVELAND, OHIO, A CORPORATION OF OHIO

INDEXING CHUCK

Application filed October 24, 1929. Serial No. 402,061.

My invention relates to an improvement in chucks, and in general my object is to provide a revoluble chuck which may be indexed while revolving. Thus, the chuck includes a pair of clamping jaws for holding the work, adjustable means for opening and closing said jaws, and also means for rotating the jaws and the work together at intervals within the chuck body and for locking the jaws and the work in squared alignment with the operating tool or tools. Other and more specific objects are embodied in the details of construction of the chuck, whereby a series of operations may be accurately performed at different angles or on different portions of the piece of work without stopping the revolutions of the chuck, all as will hereinafter more fully appear, reference also being had to the accompanying drawings, in which Fig. 1 is a front elevation of the chuck, and a piece of work clamped between the jaws of the chuck; Fig. 2 a sectional view longitudinally of the chuck on line 2—2 of Fig. 1; Fig. 3 a sectional view but in a different plane than Fig. 2, as indicated by line 3—3 on Fig. 1; Fig. 4 a sectional view corresponding to Fig. 3, but showing the clamping jaws rotated a quarter turn and with the jaw operating slide shifted to the opposite side of the chuck; Fig. 5 a perspective of the operating slide; Figs. 6 to 11, inclusive, represent a series of sectional views of a chuck jaw and the operating slide in different working positions; Fig. 12 is a sectional view transversely of the chuck on line 12—12 of Fig. 2; Fig. 13 is a perspective view of one of the adjustable jaw holders; Figs. 14 and 15 perspective views of the rotatable jaws for holding a piece of work embodying angular offsets or branches; and Fig. 16 a perspective view of the supplemental slide for operating and locking the clamping jaws. Fig. 17 (Sheet 2) is a sectional view of a modified form of slide for rotating the jaws in opposite directions alternately.

The chuck comprises a circular body 2 having a round axial extension or hub 3 adapted to be screw-connected with a revoluble shaft or spindle 4 of a turret lathe, or other metal working machine. A slidable collar 5 is sleeved upon extension 3, wherewith indexing operations may be controlled while the chuck is revolving. A reciprocable plunger 6 extends through spindle 4 into an axial bore 7 in chuck body 2 where a beveled head or tapered enlargement 8 on the plunger engages the rounded inner ends of a pair of pins 9—9 arranged to slide diametrically within body 2 opposite the corresponding ends of a pair of oscillatory levers 10—10, respectively. Each lever is pivoted at about its middle and one end carries an adjustable set screw 11 which is held in contact with the outer end of its operating pin 9 by a coiled spring 12 which is arranged to press outwardly against the opposite end of the lever, see Fig. 2. The front end of each lever 10 is slotted or bifurcated to connect with a cross pin or roller 14 carried by a cylindrical supporting member 15 for the spindle or stem 16 of a workholding jaw 17. Two such jaws are used diametrically of the chuck face, and one or both are recessed at right angles, or fashioned or shaped to receive the correspondingly-shaped part or piece to be operated upon. As shown, one jaw includes a removable and replaceable die or floating jaw 17', and both jaws may be constructed in that way if desired.

The jaws shown are designed to clamp a cock or valve body A of cross shape between them, or a correspondingly shaped part having one or more angularly-related branches. In machining a cock body the main body and the branches are drilled at right angles, and counterboring as well as screw-threading and other finishing operations are required.

The present chuck permits each angular part of the cock body to be operated upon successively in a turret lathe while the chuck is revolving. To effect satisfactory results rapidly and expeditiously, the work-holding jaws are rotated on their axes with a snap movement and locked positively in a squarely-aligned position opposite the tool carried forward by the turret. One or more tools may be caused to operate on the same branch of the cock before rotating the jaws and cock together to bring a second branch in axial alignment with the same or other tools in the turret.

The means for operating and indexing the work-holding jaws include a reciprocable member or cross slide 18 seated between the face of chuck body 2 and one of the jaws 17, which for convenience may be termed the lower jaw, inasmuch as it so appears in Figs. 1 and 2. This slide 18 has two upright ends 19—19 engaged by rollers 20—20 carried by a pair of tilting arms 21—21 which are pivotally supported between their opposite ends upon opposite sides of chuck body 2, see Figs. 1 and 3. The arms 21 lie in a plane at right angles to the plane in which the levers 10 are situated, and their rear extremities carry rollers 22—22 which are engaged by and ride upon inclined ribs or cam surfaces 23—23 on collar 5. When this collar is reciprocated longitudinally on its support 3 the cross slide 18 is shifted back and forth in respect to the jaws 17. The movement of the cross slide 18 in one direction brings the notched end 24 of a spring-pressed bolt 25 into engagement with one notched corner 26 at the base of the lower jaw 17, which is square or flat-sided. Bolt 25 and spring 27 are confined within cross slide 18 and the flat front face of this slide is recessed at 28 where the notched end 24 of the bolt protrudes. The flat side of slide 18 locks jaw 17 against rotatable movement when the slide is at rest, but when the slide is shifted and the notched end 24 engages a notched corner of the flat sided jaw 17, that corner has freedom to turn in the recess 28 in the flat side of the slide, see Fig. 10. Then as the slide moves onward, the spring-pressed bolt is forced inward until the slide carries the bolt past the center of turning movement of the jaw. Then the bolt rotates the jaw with a snap movement until the flat side of the jaw strikes and rests flush against the flat side of the cross slide, thereby completing the quarter turn movement of the jaw and locking the same squarely and rigidly to receive the operating tool carried by the turret. The return movement of the cross slide may precede or follow the machining operation, and locking of the rotatable jaw will be effected in either position.

As an aid to locking and turning both jaws and the work, a second or supplementary spring-pressed member 29 is employed for the upper jaw 17, see Figs. 2 and 6. Member 29 is a rectangular piece of metal grooved to slide between two channeled strips 30 fixed to the bottom of an adjustable block or main jaw 31 carrying the upper work-holding jaw 17, which is also square or flat-sided where exposed opposite said locking and turning member 29. A coiled spring 32 presses member 29 tightly against upper jaw 17, see Fig. 2, but when the lower jaw is rotated the work clamped between the jaws causes the upper jaw to rotate likewise.

Member 29 yields until the square corner of upper jaw 17 passes the center line, whereupon spring 32 co-acts with spring 27 behind bolt 25 to rotate both jaws a full quarter and to lock the same when so turned, see Figs. 6 to 11, inclusive. Locking member 29 and slide 18 also hold the jaws in fixed relation when the jaws are open and not clamping a piece of work between them.

The spindles or round stems 16 have rotatable bearing within removable bushings 33 carried by the cylindrical supporting members 15, and a ball bearing 34 is also preferably employed at the end of the stem, or both side and thrust ball bearings may be used. The cylindrical supporting members 15 are also arranged to slide in bronze bushings 34' confined within the front overhanging ends 35 of a pair of adjustable blocks or main jaws 31—36 which are clamped diametrically opposite each other upon the face of chuck body 2. Blocks 31—36 are flanged and dove-tailed to slide upon the face of body 2, and the levers 10 are confined in end slots in these blocks and are pivotally supported thereby. When blocks 31—36 are adjusted to place them nearer or farther apart, the set screws 11 are also adjusted to maintain a proper working relationship between the levers and their respective operating pins 9. The cross slide 18 is mounted in a guide way at the top of lower block 36, and the operating member 29 for the upper jaw 17 is mounted upon upper block 31. Consequently, when these blocks are adjusted the working parts associated with the two jaws will not be disturbed, and different sizes and kinds of work may be clamped between the jaws and operated upon.

Instead of rotating the jaws a quarter turn and then repeating the movement in the same direction, a modified form of operating slide 18' and bolt 25' may be utilized to rotate the jaws first in one direction upon the forward movement of the slide and then reversely upon the return movement of the slide, see Fig. 17. This modified form of the device would be useful in machining an angular part such as an elbow, or a body having a single branch. Other modifications within the scope of the invention, might also be made, nor do I limit myself to the exact shape, size and form of the parts as delineated.

The present chuck may be used on turret lathes, drills, milling machines and any other machine wherein the work revolves and requires indexing, and the chuck can also be used as an ordinary chuck, with this difference, that the air-operated jaws for holding the work are supported in a second set of adjustable jaws or holders.

When the indexing slide 18' is shifted in either direction, the chuck is unbalanced due to the fact that a greater length and more metal is placed on one side of the axis than the other. To offset this condition, the rocker arms 21 are each provided with lugs or weights 38 at their corresponding ends, thereby balancing the chuck and preventing vibration.

The indexing jaws shown are square, but they may be of any other desirable angular form in cross section, that is triangular, hexagonal, etc.

What I claim is:

1. An indexing chuck, comprising a revoluble body, a pair of jaws mounted rotatably on the same axis diametrically of said body, and means movable across the face of said chuck for rotating and locking said jaws intermittently.

2. An indexing chuck, comprising a main body, a pair of aligned clamping jaws rotatably mounted upon said body, a reciprocable device directly rotating and locking said jaws, and a reciprocable collar and associated means for operating said device.

3. An indexing chuck, comprising a revoluble body, a pair of rotatable jaws mounted diametrically upon said body, a cross slide mounted adjacent said jaws upon the face of said chuck for rotating and locking the jaws, and means carried upon said body for reciprocating said cross slide, and balancing said chuck in its revoluble movements.

4. An indexing chuck, comprising a main body; a set of jaws mounted in reciprocable and rotatable relation upon said body; means for opening and closing said jaws; and means for rotating said jaws in opposite direction alternately, said means also serving to align and lock said jaws in work-holding position.

5. An indexing chuck, comprising a main body; a set of rotatable jaws slidably mounted in work-holding position upon said body; means mounted upon said body for opening and closing said jaws; and a reciprocable device movable across the face of said chuck for rotating said jaws by degrees and for locking the jaws rigidly against rotation.

6. An indexing chuck, comprising a main body; a set of jaw holders adjustably mounted upon said body; a set of jaws mounted to slide and rotate upon said holders; means for opening and closing said jaws; and means for rotating said jaws intermittently in predetermined degree, said means engaging and locking the jaws rigidly against rotation subsequent to rotatable movement thereof.

7. An indexing chuck, comprising a chuck body; a set of jaw holders mounted adjustably upon the face of said body; means for opening and closing said jaws; a reciprocable locking member engageable with one of said jaws, including a yieldingly mounted bolt carried by said member adapted to engage and rotate said jaw; and means for reciprocating said member.

8. An indexing chuck, including a revoluble body; a set of rotatable jaws carried by said body, one of said jaws having flat faces; and means for rotating said jaws, including a shiftable member having a flat face engageable with the flat faces of said jaw.

9. An indexing chuck, including a revoluble body; a set of work-holding jaws rotatably mounted upon said body, one of said jaws having flat faces radially thereof; a cross slide having a flat surface engageable with the flat faces of said jaw; a yielding member on said slide adapted to engage and rotate said jaw; and means for operating said cross slide.

10. An indexing chuck, comprising a revoluble body; a pair of rotatable clamping jaws mounted upon said body; each of said jaws having flat sides radially thereof; and means for rotating said jaws, including separate locking members engageable with the flat sides on said jaws.

11. An indexing chuck, comprising a revoluble body having a pair of rotatable indexing jaws mounted thereon; a reciprocable member having means yieldingly engageable with one of said jaws adapted to rotate the same; and a spring-pressed locking device engageable with the second jaw.

12. An indexing chuck, comprising a revoluble body having a pair of rotatable jaws, each formed with angularly-related flat faces radially thereof; a reciprocable cross slide having a flat locking face for one of said jaws, and means for imparting a rotatable movement to the jaws; and a supplementary locking device yieldably associated with the second jaw.

13. An indexing chuck, including a revoluble body; a rotatable work-holding jaw mounted upon said body; having means radially thereof for rotating the same; a reciprocable member having a spring-pressed bolt adapted to yieldingly engage said radial means during rotation of said jaw; and means for reciprocating said member.

14. An indexing chuck, including a revoluble body having a pair of clamping jaws rotatably mounted thereon; one of said jaws having angular faces and notched corners; a reciprocable slide having a flat face engageable with the faces on said jaw and formed with a recess adapted to permit a partial rotatable movement of said jaw; and a spring-pressed member carried by said slide adapted to engage said notched corners to rotate said jaw.

15. An indexing chuck, comprising a revoluble body having an extension adapted to be connected to a rotatable spindle; a cam collar mounted to slide on said extension; rocker levers mounted on said body engageable with said cam collar; a cross slide interposed between said levers transversely of said body; a set of rotatable clamping jaws, one having locking engagement with said slide; means carried by said slide for rotating said jaws; and means for opening and closing said jaws.

16. An indexing chuck, comprising a revoluble body; a pair of adjustable jaw holding blocks mounted upon said body; a pair of work-holding jaws rotatable and slidably mounted upon said blocks; means mounted on said body and blocks adapted to rotate said jaws intermittently while holding a piece of work; a tapered plunger movable axially of said body and pins radially of said body engaging said plunger; rocker arms connected with said jaws for opening and closing the same; and set screws carried by said arms engaged by said pins.

17. An indexing chuck, comprising a revoluble body having a reduced extension; a cam collar mounted on said extension; oscillatory levers mounted on said body operatively engaged by said cam collar; a cross slide transversely of said body operatively engaged by said levers; a pair of supporting members adjustably mounted upon said body; cylindrical members slidably mounted within said supporting members; a pair of work-holding jaws rotatably mounted within said slidable cylindrical members; means associated with said cross slide for rotating said jaws and locking them immovably when rotated; rocker arms connected with said cylindrical members; a tapered plunger movable axially within said body; and means radially of said body adapted to be engaged by said plunger and adjustably connected to said rocker arms.

In testimony whereof I affix my signature.

FRED HUNZIKER.